United States Patent
Bullinger et al.

(10) Patent No.: US 7,100,945 B2
(45) Date of Patent: Sep. 5, 2006

(54) METHOD FOR ACTUATING A REVERSIBLE BELT PRETENSIONER

(75) Inventors: Wilfried Bullinger, Korntal-Muenchingen (DE); Walter Eberle, Hochdorf (DE); Markus Woldrich, Ditzingen (DE)

(73) Assignee: DaimlerChrysler AG, Stuttgart (DE)

( * ) Notice: Subject to any disclaimer, the term of this patent is extended or adjusted under 35 U.S.C. 154(b) by 266 days.

(21) Appl. No.: 10/433,896

(22) PCT Filed: Dec. 6, 2001

(86) PCT No.: PCT/EP01/14328

§ 371 (c)(1),
(2), (4) Date: Dec. 10, 2003

(87) PCT Pub. No.: WO02/47049

PCT Pub. Date: Jun. 13, 2002

(65) Prior Publication Data

US 2004/0089758 A1    May 13, 2004

(30) Foreign Application Priority Data

Dec. 8, 2000 (DE) ............... 100 61 040

(51) Int. Cl.
*B60R 22/34* (2006.01)
(52) U.S. Cl. ............ 280/806; 280/807; 180/268
(58) Field of Classification Search ............ 180/268; 280/806, 807, 801.1; 297/480, 474, 475, 297/476, 477, 478
See application file for complete search history.

(56) References Cited

U.S. PATENT DOCUMENTS

| 5,788,281 | A | 8/1998 | Yanagi et al. |
| 5,931,402 | A * | 8/1999 | Weller ............... 242/383.2 |
| 6,447,012 | B1 * | 9/2002 | Peter et al. ............ 280/806 |
| 6,530,536 | B1 * | 3/2003 | Sumiyashiki et al. .... 242/383.2 |
| 6,604,597 | B1 * | 8/2003 | Fujii et al. ............ 180/268 |
| 6,702,326 | B1 * | 3/2004 | Fujii ................... 280/806 |
| 2004/0056471 | A1 * | 3/2004 | Bullinger et al. ........ 280/806 |

FOREIGN PATENT DOCUMENTS

DE    19954878    6/2000

OTHER PUBLICATIONS

U.S. Appl. No. 10/433,897, filed Jun. 6, 2003, Method for Actuating a Reversible Belt Pretensioner, Inventor: Wilfried Bullinger, et al.

* cited by examiner

*Primary Examiner*—Paul N. Dickson
*Assistant Examiner*—Tiffany L. Webb
(74) *Attorney, Agent, or Firm*—Crowell & Moring LLP

(57) ABSTRACT

Method for actuating a reversible belt pretensioner for pretensioning a belt webbing, the belt pretensioner having a drive which acts on the belt reel, and the seat belt having, as a belt extraction lock, a locking device which acts on the belt reel in the unwinding direction and whose locking can be released only if the belt reel is rotated through a specific angle of rotation in the winding-on direction. After the triggering of the belt pretensioner, the drive of the belt pretensioner for opening the locking device is actuated in an opening mode such that firstly, in a winding-on phase, the belt reel rotates through the specific angle of rotation in the winding-on direction. In a subsequent holding phase, the drive of the belt pretensioner is actuated for a predefinable holding time $T_H$ such that the belt reel is held in its angular position.

15 Claims, 1 Drawing Sheet

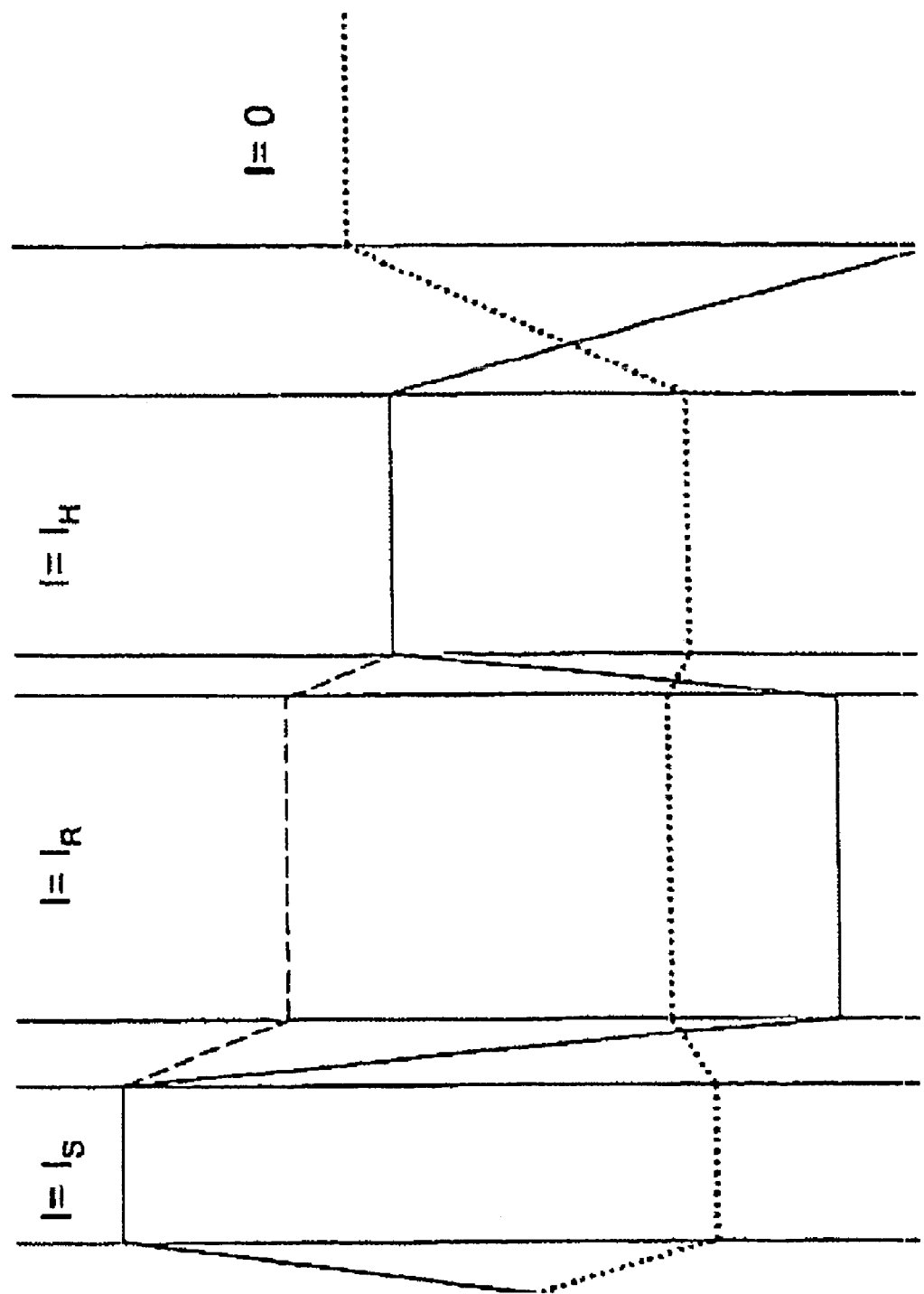

METHOD FOR ACTUATING A REVERSIBLE BELT PRETENSIONER

BACKGROUND AND SUMMARY OF THE INVENTION

This application claims the priority of International Application No. PCT/EP01/14328, filed Dec. 6, 2001, and German Patent Document No. 100 61 040.4, filed Dec. 8, 2000, the disclosures of which are both incorporated by reference herein.

The present invention relates to a method for actuating a reversible belt pretensioner.

Seat belts which are nowadays usually installed in motor vehicles have a mechanism for automatically winding on the loose belt webbing onto a belt winding-on roller which is arranged on a belt reel. The automatic winding on ensures that the belt which is being worn rests loosely against the body of the vehicle occupant, and when the seat belt is not in use it is rolled up on the belt winding-on roller. The unwinding of the belt from the belt winding-on roller takes place counter to a torque which is generated by a return spring and is also possible when the belt is being worn in order to permit the vehicle occupant to make a largely free movement.

Furthermore, a locking device which acts as a belt extraction lock is usually present. This locking device is triggered by an actuation device with a belt-webbing sensitive and vehicle-sensitive sensor when the belt is being unwound rapidly from the belt winding-on roller, starting from a predefined acceleration of the belt winding-on roller in the unwinding direction or starting from a predefined acceleration of the vehicle. The belt winding-on roller is fixed in the present position in such a way that the belt is prevented from unwinding. A customary locking device is composed, for example, of a locking toothing of the belt reel and a locking latch which is pivotably mounted and can be pivoted into the locking toothing of the belt reel by means of the actuation device. The toothings on the belt reel and the locking latch are of self-locking design, causing the extraction of the belt to be locked for as long as tensile loading is applied to the belt. If the belt is relieved of this tensile loading, the locking mechanism can open, that is to say it can be returned into its inactive state. This return takes place magnetically, electromotively, or usually mechanically, for example by means of a restoring spring on the pivotably mounted locking latch. Such a locking device and a method for actuating a belt pretensioner with such a locking device are described in the post-published German Patent Document No. DE 100 61 040 A1.

In addition, in many seat belts there is a belt pretensioner which increases the protective effect of the seat belt. The belt pretensioner has a drive which can be actuated in order to drive a mechanical device which shortens the loose belt webbing and/or pulls the vehicle occupant backwards. In the case of a pyrotechnic energy store, for example a chemical substance is caused to undergo an exothermic reaction by means of a firing element. In this reaction, a gas flow, which drives the mechanical device, is generated. The driven device is, or can be, mechanically connected to the belt reel, for example by means of a clutch. By means of this connection, the mechanical device exerts a torque on the belt reel. Owing to this torque, the belt reel rotates with the belt winding-on roller arranged on it and pretensions the unwound belt webbing.

Apart from the usually pyrotechnic belt pretensioners which are used nowadays in motor vehicles, it is also possible to use reversible belt pretensioners in vehicles which can be triggered repeatedly, even rapidly in succession. These reversible belt pretensioners can have different drives, for example such a belt pretensioner can be driven by an electric motor which acts on the belt reel permanently or in a way which can be controlled by means of a clutch. Other reversible belt pretensioners are driven with compressed air from a pressure accumulator or by means of a tensioned spring, it being possible to refill the pressure accumulator during the travel mode and to stress the spring again during the travel mode.

Reversible belt pretensioners which are driven in this way permit the seat belt to be pretensioned to a predefinable degree, with a predefinable velocity and for a predefinable period of time. The multiple triggering capability of the reversible belt pretensioner permits it to be triggered preventatively. Preventative triggering means that the belt pretensioner is triggered in safety-critical travel situations which are detected, for example, by vehicle-movement dynamics sensors or vehicle-surroundings sensors or which are determined by means of the evaluation of the actuation of the brake pedal, of the steering angle or of a driver observation. In addition to preventative triggering, a reversible belt pretensioner can also be used for haptic warning of the driver in safety-critical situations. When there is preventative triggering of the belt pretensioner which may occur before a collision is detected or when the belt pretensioner is triggered for warning purposes, it is desirable that the belt should rest loosely against the vehicle occupant again after pretensioning has taken place, after the hazardous situation has ended and when the normal travel mode has been safeguarded. The normal travel mode is safeguarded if the evaluation of the situation by a control unit or a hazard computer does not reveal that there is a safety-critical situation or if the condition which is necessary for the triggering of the belt pretensioner is no longer fulfilled. Such a condition may be the presence or the absence of a specific signal on a data bus or a data line.

After reversible pretensioning of the seat belt by means of a reversible belt pretensioner it is possible that the belt extraction lock has become active owing to a belt-webbing-sensitive sensor or a vehicle-sensitive sensor which actuate the locking device electrically or mechanically. Examples of belt-webbing-sensitive sensors are a mechanical centrifugal-force sensor in the belt winding-on mechanism, an electro-mechanical centrifugal-force sensor and an electronic belt extraction sensor which senses the extraction velocity of the belt webbing or its acceleration. In particular, a belt-webbing-sensitive sensor can respond if, after belt pretensioning, the pretensioned belt is released which is under tensile loading. This tensile loading of the pretensioned belt is in particular dependent on the degree of the pretensioning operation which has previously occurred and on the sitting position of the vehicle occupant before the pretensioning operation. As a result of this tensile loading, the belt is unwound again from the belt winding-on roller after the pretensioning operation and once the torque exerted on the belt reel by the belt pretensioner drive decreases. If the unwinding of the belt webbing takes place too quickly, the belt-webbing-sensitive sensor responds and the locking device is actuated—usually mechanically—so that it closes. That is to say the belt extraction lock becomes active. The belt extraction lock can already become active if the belt-webbing-sensitive sensor responds owing to the winding-on operation during the pretensioning of the belt, or the vehicle-sensitive sensor responds owing to the movement of the vehicle. If the belt extraction lock is active, it is no longer possible to unwind the pretensioned belt webbing and the freedom of movement of the vehicle occupants is greatly restricted. The belt webbing is therefore to be released again if the cause of the triggering of the belt pretensioner no longer applies or if a normal travel mode is ensured. In order to release the belt webbing again, in locking devices which are customary today in motor vehicles, the locking latch has to be released from the locking toothing. The belt webbing can be released only if the vehicle-sensitive and the belt-webbing-sensitive sensor do not actuate the locking device in order to close it.

The object of the invention is to improve the convenience when applying a reversible belt pretensioner.

In the method according to the invention for actuating a belt pretensioner, the belt pretensioner is actuated to open the locking device in an opening mode after the belt pre-tensioning operation which has taken place owing to a hazardous situation in order to protect a vehicle occupant, and when a predefinable condition, which is indicative of the ending of the hazardous situation and thus indicative of a normal operating state of the vehicle, applies. This actuation takes place in such a way that the belt reel firstly rotates, in a winding-on phase, through a specific angle of rotation in the winding-on direction, as the locking device can open only if the belt webbing no longer exerts any force on the locking mechanism, and for example in the case of a locking device with undercut locking toothing, a rotation of the belt reel at least through the undercut of the teeth takes place, the belt webbing being slightly wound on. In a holding phase which follows the winding-on phase, the drive of the belt pretensioner is actuated for a predefinable holding time $T_H$ in such a way that the belt reel is held in its angular position during this holding time $T_H$, that is to say the belt reel does not rotate and the belt is not unwound or wound on. Here, the locking device is relieved, for a predefinable holding time $T_H$ of the tensile loading which originates from the pretensioned belt which is resting tightly against the vehicle occupant. After the holding phase, the belt webbing is released in an unwinding phase in order to unwind. The advantage of the invention is that the holding time $T_H$ can be defined in such a way that up to its end the belt webbing can be unwound with a desired probability.

As the locking device has to be opened, and the vehicle-sensitive sensor must not respond so as to be able to unwind the belt webbing, the holding time $T_H$ is, for example, predefined in such a way that these conditions are fulfilled with the predefined probability.

In one refinement of the method, the holding time $T_H$ is predefined in such a way that it is ensured that at the latest up to the end of the holding time $T_H$, the vehicle-sensitive sensor of the belt extraction lock permits the opening of the locking device. This ensures that the actuation of the belt pretensioner drive is terminated, and the motor current of the belt pretensioner drive motor reduced, only if the belt reel rotates in the unwinding direction and can release the belt webbing for unwinding, without the belt extraction lock being active. A repeated actuation of the belt pretensioner drive which is necessary to release the locking device as a result of an active belt extraction lock, and an associated repeated belt webbing winding-on operation, which could disturb or irritate the vehicle occupant, are prevented.

In one development of the method, a variable which is indicative of the opening of the locking device is registered. The holding time $T_H$ will last at least until it is determined that the locking device is opening, by means of the variable which is indicative of the opening of the locking device. This refinement has the advantage that the holding time $T_H$ does not need to be predefined, independently of the situation, with such a magnitude that in all, or at least the most frequently occurring, situations, the opening of the locking device is ensured within the holding time $T_H$. The holding time can as a result be shortened significantly depending on the travel situation, in order to increase the convenience for the vehicle occupants.

A variable which is indicative of the opening of the locking device is, for example, the signal of a contact switch on the locking device which closes a contact precisely if the locking device assumes one of the two states Opened or Closed, and which opens the contact if the locking device assumes the other of the two states.

In one refinement of the method, the holding time $T_H$ is predefined as a function of at least one vehicle-movement-dynamics parameter. The predefined parameter or parameters are registered, and the holding time $T_H$ is determined in accordance with the predefined function by means of the registered parameter or parameters. In a simple case, the function can, for example, be such that in the case of full braking from a velocity above a velocity threshold value, the holding time $T_H$ is higher than in the case of full braking from a velocity below the velocity threshold value. The advantage of this refinement is that the holding time $T_H$ is adapted to the respective situation.

In one refinement of the method, the longitudinal acceleration or its profile is used as a parameter for determining the holding time $T_H$. The longitudinal acceleration of the vehicle which occurs, for example, during a braking maneuver, is registered and the belt pretensioner is actuated in such a way that the belt reel is held, by the belt pretensioner drive, in the position in which the locking device can open, until the registered longitudinal acceleration is smaller for a predefinable time period than a predefinable threshold value. The advantage of this refinement of the method is that, with the vehicle longitudinal acceleration, a variable is used which also influences the locking device of a belt system: if the longitudinal acceleration is above a predefined threshold, the locking mechanism cannot open owing to an acceleration-sensitive sensor which responds, for example, starting from a vehicle acceleration of 0.3 g. Instead of the longitudinal acceleration (or its profile) or preferably in addition to the longitudinal acceleration, the transverse acceleration (or its profile) can also be used in the same way.

In another refinement, in order to determine the time period during which the belt reel is held in a position in which the locking device can open, a brake pressure (or its profile) and/or a coefficient of friction between the tire and road and/or the vehicle's own velocity (or its profile) and/or the position of the accelerator pedal and/or the steering angle and/or the yaw angle and/or the transverse acceleration are registered. Alternatively, or in addition hereto, a signal of a brake booster system or a signal of a vehicle-movement dynamics control system is registered and used to determine the holding time $T_H$.

In one simple refinement, the holding time $T_H$ is a function of the longitudinal acceleration, in which case, when there is a change in acceleration from negative acceleration (deceleration, for example due to a braking intervention) to positive acceleration (for example due to activation of the accelerator pedal), the holding time $T_H=0$ is set.

In a further refinement of the method, the holding time $T_H$ is a function of the velocity of the vehicle and of a signal of a brake booster system. The outputting of this brake booster signal by the brake booster system brings about full braking and triggering of the reversible belt pretensioner in order to protect a vehicle occupant. The holding time $T_H$ is then equal to a first time period $T_1$ if, after the disappearance of this brake booster signal and/or after termination of the full braking, the vehicle has a velocity which is less than or equal to a velocity threshold value, and the holding time $T_H$ is equal to a second time period $T_2$ if, after the disappearance of the brake booster signal, the vehicle has a velocity which is higher than the velocity threshold value. The velocity threshold value is preferably equal to zero. A plurality of different velocity threshold values and a plurality of holding times $T_1$ to $T_n$ can also be predefined in order to refine the method.

In one simple example, a distinction is made between two cases by means of the velocity threshold value zero: if full braking takes place up to the stationary state of the vehicle, the full braking will be considered to be terminated starting from the time from which the vehicle no longer has any intrinsic velocity. The intrinsic velocity when the vehicle is in a stationary state is equal to zero, that is to say equal to the velocity threshold value so that the holding time is equal to $T_1$. If the full braking does not take place up to the stationary state of the vehicle, the vehicle has an intrinsic velocity greater than zero, and the holding time is equal to $T_2$, after the disappearance of the brake booster signal. As the vehicle takes up energy in the chassis during full braking with sufficient friction on the underlying surface, the vehicle oscillates in the stationary state for a short time (up to approximately 1 sec). During this time, accelerations occur on the chassis and they allow the belt extraction lock to become active owing to the vehicle-sensitive sensor, so that the unwinding operation cannot take place. The holding time $T_1$ is selected to have a corresponding magnitude, for example equal to $T_1=1$ sec. If the full braking does not take place as far as the stationary state of the vehicle, these oscillations do not take place or only, take place very weakly, which is due to continuous loosening of the brake linings which takes place for design reasons in contemporary vehicles. The holding time $T_2$ can consequently be selected to be significantly shorter, and is for example $T_2=0.3$ sec.

In the holding mode, the belt pretensioner drive is actuated in such a way that the belt reel is held, by the belt pretensioner drive, in a position in which the position of the toothing against a locking latch and a gear wheel which is located on the belt reel permits the opening of the locking device.

The belt reel is preferably rotated by means of the belt pretensioner drive only just until a position in which the locking device can open is reached for the first time. This position can be determined by registering the angle of rotation of the belt reel, for example by means of an angle-of-rotation sensor, or the profile of the motor current is evaluated. The rise in force in the belt which is brought about by the actuation in order to open the locking device is kept as small as possible by rotating the belt reel as little as possible.

In addition, it is advantageous if the actuation of the belt pretensioner takes place in such a way that, in an unwinding phase which follows the holding phase, the torque of the belt pretensioner drive is not reduced suddenly but rather slowly. As a result, the unwinding operation takes place in such a way that the belt-webbing-sensitive sensor does not respond and the locking device does not become active again. The slow reduction of the torque takes place, for example, by continuously reducing the motor current of an electromotive belt pretensioner. After the unwinding phase, the vehicle occupant is in the state in which he is wearing a belt with the belt resting loosely against him.

BRIEF DESCRIPTION OF THE DRAWINGS

One advantageous embodiment of the method according to the invention will be described below in more detail with reference to the drawing, in which:

FIG. 1 shows the profiles of the belt pretensioner drive force F (unbroken line/dashed line) and the belt travel s (dotted) over time t during the execution of the method according to the invention.

DETAILED DESCRIPTION OF THE DRAWINGS

In FIG. 1, the profiles are represented only qualitatively and the relationships between the individual time intervals between two respective times $t_n$ and $t_{n+1}$ do not correspond to those during an actual method sequence.

In the figure, the times to designate the start, and $t_7$ the end, of the method for actuating a reversible belt pretensioner.

The reversible belt pretensioner which is used to describe the figure is, for example, an electromotively driven belt pretensioner. However, alternatively, a pneumatically or hydraulically driven belt pretensioner can also be used. In the case of an electromotive belt pretensioner, the most important directly controllable variable is the motor current which flows through the drive motor. For this reason, reference is made below to the motor current I. This is closely associated with the belt pretensioner drive force F which the belt pretensioner drive exerts on the belt. An increase in the motor current generally also brings about an increase in the belt pretensioner drive force F.

The belt pretensioning for protecting a vehicle occupant starts at the time $t_0$. At this time $t_0$, the vehicle is in a normal operating state and the belt pretensioner is consequently in the initial state, that is to say it is inactive. Correspondingly, the motor current which flows through the belt pretensioner drive motor in the initial state is I=0. At the time $t_0$, a control signal of a brake booster system which causes the reversible belt pretensioner to be triggered in order to protect a vehicle occupant, is then registered. The belt pretensioner drive motor pretensions the belt with a predefinable high pretensioning force, that is to say the motor current is $I=I_S$, it being possible to adapt the motor current or the belt pretensioner drive force to a hazardous situation and/or to determined vehicle occupant parameters as a function of the embodiment of the belt pretensioner. The belt force rises to a pretensioning value, and the belt length which is unwound from the belt reel drops to a minimum value.

The end of the actual belt pretensioning, which serves to protect the vehicle occupant, is defined by a predefinable time interval $t_2-t_0$, and is additionally or alternatively associated with a predefinable condition, for example a threshold value for the acceleration of the vehicle or the force of the belt. In this pretensioning interval, the motor current rises up to the time $t_1$ in order to remain at the predefinable pretensioning value $I_S$ for a brief time period $t_2-t_1$. The time period $t_2-t_1$ can also be 0 sec, so that the rising phase of the motor current is followed immediately by the phase between the times $t_2$ and $t_3$ in which the motor current is reduced to a restraining level $I=I_R$. This restraining level of the motor current can be relatively high (dashed profile between $t_3$ and $t_4$), the extraction of the belt being largely prevented by the holding force of the drive motor of the belt pretensioner. However, the restraining level of the motor current is preferably relatively low (unbroken profile between $t_3$ and $t_4$). Part of the restraining force is then generated by the frictional forces which occur, for example, at the belt deflection roller. The motor current can additionally be reduced, for example, as far as $I=I_{R}=0$ in the event of a vehicle acceleration above 5 m/s$^2$. Undesired extraction of the belt between the times $t_3$ and $t_4$ is almost completely prevented in this case ($I_R<<I_S$) by the locking device, with the exception of slight unwinding of the belt webbing until the belt reel reaches a position in which the locking device engages and prevents further extraction of the belt.

By means of parameters such as the velocity of the vehicle, the activation of the brake pedal, the activation of the accelerator pedal or the activation of the steering wheel, the end of a hazardous situation and a normal operating state of the vehicle are determined, for example when the brake pedal is released after full braking or the vehicle comes to a standstill.

After a normal operating state of the vehicle is determined at the time $t_4$, and if appropriate further conditions are fulfilled, the drive of the belt pretensioner is actuated in the opening mode. The motor current of the drive motor of the belt pretensioner is regulated to a holding current strength $I=I_H$ for a predefinable holding time $T_H=t_6-t_5$. The motor current is regulated in the opening mode in such a way that between the times $t_4$ and $t_5$ the belt reel rotates in the unwinding direction until the position of the belt reel permits the locking device to open, the belt reel being unwound by a small amount. For this purpose, in a customary locking device which is composed of a locking latch and a complementary toothing on the belt reel, the undercut teeth of the locking latch and toothing must no longer overlap. The minimum angle of rotation is given by the angle of the undercut in such a locking device. At the time $t_5$, the belt reel has rotated through the necessary angle of rotation which can be registered by means of an angle-of-rotation sensor or determined by evaluating the motor current.

In the particular case in which even after the hazardous situation has ended, a vehicle occupant is held in the opening mode with a high force by the belt webbing, the holding current $I_H$ may be higher than the original pretensioning current $I_S$.

So that the locking device can open, or so that it does not close again when the belt webbing unwinds, further conditions must be fulfilled. For example, the acceleration of the vehicle must be below a predefined acceleration threshold value so that the acceleration-sensitive sensor does not respond. After full braking this is frequently the case only after a brief transient recovery phase of the vehicle. For this reason, the holding time $T_H=t_6-t_5$ is determined as a function of the velocity of the vehicle and a brake booster signal and $T_H=T_1$ is set if, owing to the disappearance of the brake booster signal at the time $t_4$, the velocity of the vehicle is equal to zero when the opening mode is initiated. If the travel velocity is greater than zero when the opening mode is initiated, the holding time $T_H=T_2$ is set, where $T_1>T_2$. At the time $t_6$, it is ensured that all the conditions for opening the locking device are fulfilled, and the belt webbing is released in the unwinding phase between the times $t_6$ and $t_7$ for unwinding. At the time $t_7$ the reversible belt pretensioner is in the initial state again.

Two or more drive devices may be provided as the belt pretensioner drive. In particular, a second electric motor may be provided in addition to a first electric motor, the first electric motor or the first drive device being configured specially for the belt pretensioning in a hazardous situation, and the second electric motor or the second drive device being configured specially for the opening mode.

The invention claimed is:

1. A method for actuating a reversible belt pretensioner for pretensioning a belt webbing wound around a belt reel of a seat belt in a motor vehicle, the belt pretensioner having a drive which acts on the belt reel, and the seat belt having, as a belt extraction lock, a locking device which acts on the belt reel in an unwinding direction and is released only if the belt reel is rotated through a specific angle of rotation in a winding-on direction, comprising the steps of:
triggering the belt pretensioner by a hazardous situation;
satisfying a predefined vehicle operating state which indicates an end of the hazardous situation; and
actuating the drive of the belt pretensioner for opening the locking device in an opening mode wherein in a first winding-on phase the belt reel is rotated through the specific angle of rotation in the winding-on direction to an angular position and wherein in a subsequent, holding phase the drive of the belt pretensioner is actuated for a predefinable holding time ($T_H$) in such a way that the belt reel is held in the angular position.

2. The method according to claim 1, wherein the holding time ($T_H$) is predefined in such a way that a vehicle-sensitive sensor of the belt extraction lock permits the opening of the locking device up to an end of the holding time ($T_H$).

3. The method according to claim 1, wherein the holding time ($T_H$) is predefined as a function of at least one vehicle-movement dynamics parameter, wherein the parameter necessary for determining the holding time ($T_H$) is registered, and wherein the holding time ($T_H$) is determined by the registered parameter.

4. The method according to claim 1, wherein the holding time ($T_H$) is a function of a vehicle longitudinal acceleration.

5. The method according to claim 1, wherein the holding time ($T_H$) is a function of a vehicle transverse acceleration.

6. The method according to claim 1, wherein the holding time ($T_H$) is a function of a coefficient of friction between a tire of the vehicle and a road surface.

7. The method according to claim 1, wherein the holding time ($T_H$) is a function of a brake pressure.

8. The method according to claim 1, wherein the holding time ($T_H$) is a function of a velocity of the vehicle.

9. The method according to claim 1, wherein the holding time ($T_H$) is a function of a yaw rate of the vehicle.

10. The method according to claim 1, wherein the holding time ($T_H$) is a function of a steering angle of the vehicle.

11. The method according to claim 1, wherein the holding time ($T_H$) is a function of a signal of a vehicle-movement dynamics control system.

12. The method according to claim 1, wherein the holding time ($T_H$) is a function of a signal of a brake booster system.

13. The method according to claim 1, wherein the holding time ($T_H$) is a function of a velocity of the vehicle and of a signal of a brake booster system, the brake booster signal bringing about full braking and triggering of the reversible belt pretensioner in order to protect a vehicle occupant, and the holding time ($T_H$) being equal to a first time period ($T_1$) if, after a disappearance of the brake booster signal and/or after a termination of the full braking, the vehicle has a velocity which is less than or equal to a velocity threshold value, and the holding time ($T_H$) is equal to a second time period ($T_2$) if, after the disappearance of the brake booster signal, the vehicle has a velocity which is higher than the velocity threshold value.

14. The method according to claim 13, wherein the first time period ($T_1$) is longer than the second time period ($T_2$).

15. The method according to claim 13, wherein the velocity threshold value is equal to zero.

* * * * *